United States Patent
Meirosu et al.

(10) Patent No.: US 11,030,003 B2
(45) Date of Patent: Jun. 8, 2021

(54) METHOD AND CLOUD MANAGEMENT NODE FOR MANAGING A DATA PROCESSING TASK

(71) Applicant: TELEFONAKTIEBOLAGET LM ERICSSON (PUBL), Stockholm (SE)

(72) Inventors: Catalin Meirosu, Solna (SE); Tereza Cristina Carvalho, São Paulo (BR); Viviane Tavares Nascimento, São Paulo (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 72 days.

(21) Appl. No.: 16/318,174

(22) PCT Filed: Aug. 11, 2016

(86) PCT No.: PCT/SE2016/050746
§ 371 (c)(1),
(2) Date: Jan. 16, 2019

(87) PCT Pub. No.: WO2018/030924
PCT Pub. Date: Feb. 15, 2018

(65) Prior Publication Data
US 2019/0286484 A1    Sep. 19, 2019

(51) Int. Cl.
*G06F 9/48* (2006.01)
*G06F 9/50* (2006.01)
(Continued)

(52) U.S. Cl.
CPC .......... *G06F 9/4893* (2013.01); *G06F 9/4887* (2013.01); *G06F 9/5094* (2013.01);
(Continued)

(58) Field of Classification Search
CPC ........ G06F 9/4893; G06F 9/4887; G06F 9/50; G06Q 10/0631; G06Q 50/06
See application file for complete search history.

(56) References Cited

U.S. PATENT DOCUMENTS 9,310,864 B1 *  4/2016  Klein ..................... G06F 1/3206
2001/0039586 A1 * 11/2001  Primak ............... H04L 67/1008
                                                            709/228
(Continued)

FOREIGN PATENT DOCUMENTS

CN  103297505 B    1/2016
CN  103384272 B    1/2016
WO  2011019439 A1  2/2011

OTHER PUBLICATIONS

"Re-powering Markets—Market design and regulation during the transition to low-carbon power systems"; International Energy Agency, Electricity Market Series, Feb. 18, 2016; 246 pages.
(Continued)

*Primary Examiner* — Tuan C Dao
(74) *Attorney, Agent, or Firm* — Patent Portfolio Builders PLLC

(57) ABSTRACT

A method and a cloud management node for managing a data processing task requested from a client. An amount of energy needed for executing the data processing task is first estimated and a time period during which the data processing task should be executed is also determined. An energy cost during the determined time period is further obtained. The execution of the data processing task is then scheduled within the determined time period based on the estimated amount of needed energy and the obtained energy cost. This scheduling may thus be done so that the energy cost will be as low as possible while fulfilling the amount of needed energy and execution within the determined time period.
(Continued)

The needed energy is finally acquired from an energy source for use when executing the data processing task.

20 Claims, 4 Drawing Sheets

(51) Int. Cl.
  *G06Q 50/06* (2012.01)
  *G06Q 10/06* (2012.01)
  *G06Q 10/04* (2012.01)
(52) U.S. Cl.
  CPC ......... *G06Q 10/04* (2013.01); *G06Q 10/0631* (2013.01); *G06Q 50/06* (2013.01); *Y02D 10/00* (2018.01)

(56) References Cited

U.S. PATENT DOCUMENTS

| | | | |
|---|---|---|---|
| 2010/0257531 A1 | 10/2010 | Barsness et al. | |
| 2011/0173470 A1 | 7/2011 | Tran | |
| 2011/0270452 A1 | 11/2011 | Lu et al. | |
| 2011/0271283 A1 | 11/2011 | Bell, Jr. et al. | |
| 2011/0283119 A1* | 11/2011 | Szu | G06F 1/3203 713/300 |
| 2012/0254204 A1* | 10/2012 | Pryor-Miller | G06F 40/58 707/756 |
| 2014/0281608 A1* | 9/2014 | Yin | G06F 1/3212 713/320 |
| 2015/0170080 A1* | 6/2015 | Kaushik | G06Q 10/04 705/7.22 |
| 2015/0378381 A1 | 12/2015 | Tinnakomsrisuphap et al. | |
| 2016/0019084 A1 | 1/2016 | Forestiero et al. | |
| 2016/0054774 A1 | 2/2016 | Song et al. | |
| 2016/0057039 A1* | 2/2016 | Htay | G06F 9/5072 709/224 |

OTHER PUBLICATIONS

Deng, R., et al.; "A Survey on Demand Response in Smart Grids: Mathematical Models and Approaches"; IEEE Transactions on Industrial Informatics, vol. 11, No. 3, Jun. 2015; pp. 570-582.
greenpeace.org; "Clicking Clean: A Guide to Building the Green Internet"; 2015 Update; May 2015; 72 pages.
greenpeace.org; "Clicking Green: How Companies are Creating the Green Internet"; Apr. 2014; 84 pages.
Liu, Z., et al.; "Pricing Data Center Demand Response"; ACM Sigmetrics Performance Evaluation Review, vol. 42, Issue 1; Jun. 2014; pp. 111-123.
Priya, B., et al.; "A Survey on Energy and Power Consumption Models for Greener Cloud"; 2013 3rd IEEE International Advance Computing Conference (IACC); Feb. 2013; pp. 76-82.
Siano, P.; "Demand response and smart grids—A survey"; Renewable and Sustainable Energy Reviews 30; Oct. 2013; 18 pages.
Smith, J.W., et al.; "Cloud Monitor: Profiling Power Usage"; 2012 IEEE Fifth International Conference on Cloud Computing, IEEE Computer Society, Jun. 24-28, 2012; pp. 947-948.
Wierman, A., et al.; "Opportunities and Challenges for Data Center Demand Response"; International Green Computing Conference; Nov. 3-5, 2014; 10 pages.
International Search Report and Written Opinion, dated Nov. 3, 2016, from corresponding/related International Application No. PCT/SE2016/050746.

* cited by examiner

A: Analyzing Phase

B: Scheduling Phase

C: Execution Phase

METHOD AND CLOUD MANAGEMENT NODE FOR MANAGING A DATA PROCESSING TASK

TECHNICAL FIELD

The present disclosure relates generally to a method and a cloud management node, for managing a data processing task requested from a client.

BACKGROUND

In the field of data processing, various clients such as companies, enterprises, organizations and authorities need to use hardware and software resources in order to perform various data processing operations. Traditionally, the clients themselves own and maintain all the resources they need for data processing which can be quite costly and time-consuming, though. Considerable knowledge and skills are usually required to find out what processing resources are needed, and to acquire and install those resources. Furthermore, as the technique develops rapidly in the field of computers and software, processing resources tend to become out-of-date very quickly and must frequently be replaced by new resources with better performance, which is further costly and time-consuming.

Another problem is that a client may need a great amount of resources for a very limited period of time, e.g. to make some major operation just once or a few times a year, e.g. related to economics, statistics or stock inventory, while very little resources are used during the remainder periods. The client thus needs to make investments in resources enough to cope with such peak usage and also when demands and operation change over time.

In view of the above circumstances, clients are instead able to temporarily hire resources for data processing from large data centers comprising a great range of processors, computers and data storages, which are commonly referred to as the "cloud". Effectively, all the needed resources may be available from such a data center and the clients do not have to make their own investments in costly resources as described above. They just need to send a request for a data processing task to some cloud managing entity, and the task is then scheduled to be executed by processing resources in a data center and the results are duly returned to the client. In this description a requested processing operation is referred to as a "data processing task", which can have different durations and requirements depending on the processing request. Another corresponding term commonly used in this field is "processing job" which could alternatively be used herein.

A scheduling function, or "job scheduler", is typically employed for selecting processing resources for executing a requested data processing task which may be composed of several sub-tasks that can be executed by the same resource or by different separate resources in the cloud. The job scheduler thus operates to find one or more processing resources that should be capable of executing the task, and to schedule such data processing tasks by placing them in queues to selected data centers in the cloud. In the context of cloud computing, the cloud managing entity that handles data processing tasks from clients is sometimes referred to as a "Platform as a Service, PaaS".

Data centers in a cloud environment of today consume large quantities of electric energy when performing data processing operations, and the energy consumption is also expected to greatly increase in the coming years. As a result, cloud providers will surely be regarded as major electricity consumers in the world. It can thus be said that it is a challenge for cloud providers and data centers to reduce and/or limit the energy consumption and also the energy costs when performing data processing. It is also a problem that the clients have no control of how the energy is used, and which types of energy sources are used, when their data processing tasks are executed in the data centers. For example, a client may have a general desire or policy to preferably use so-called renewable energy sources such as wind, solar and water, rather than combustion and/or nuclear power. The client naturally also wants to keep the costs for employing cloud computing as low as possible.

SUMMARY

It is an object of embodiments described herein to address at least some of the problems and issues outlined above. It is possible to achieve this object and others by using a method and a cloud management node as defined in the attached independent claims.

According to one aspect, a method is performed for managing a data processing task requested from a client. In this method, an amount of energy needed for executing the data processing task is estimated. A time period during which the data processing task should be executed is also determined and an energy cost during the determined time period is obtained. Execution of the data processing task is then scheduled within the determined time period based on the estimated amount of needed energy and the obtained energy cost. The needed energy is further acquired from an energy source for use when executing the data processing task.

According to another aspect, a cloud management node is arranged to manage a data processing task requested from a client. The cloud management node is configured to estimate an amount of energy needed for executing the data processing task. The cloud management node is further configured to determine a time period during which the data processing task should be executed, and to obtain an energy cost during the determined time period. The cloud management node is also configured to schedule execution of the data processing task within the determined time period based on the estimated amount of needed energy and the obtained energy cost, and to acquire the needed energy from an energy source for use when executing the data processing task.

The above method and cloud management node may be configured and implemented according to different optional embodiments to accomplish further features and benefits, to be described below.

A computer program is also provided that comprises instructions which, when executed on at least one processor, cause the at least one processor to carry out the above method. A carrier containing the above computer program is also provided, wherein the carrier is one of an electronic signal, an optical signal, a radio signal, a computer program storage product or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
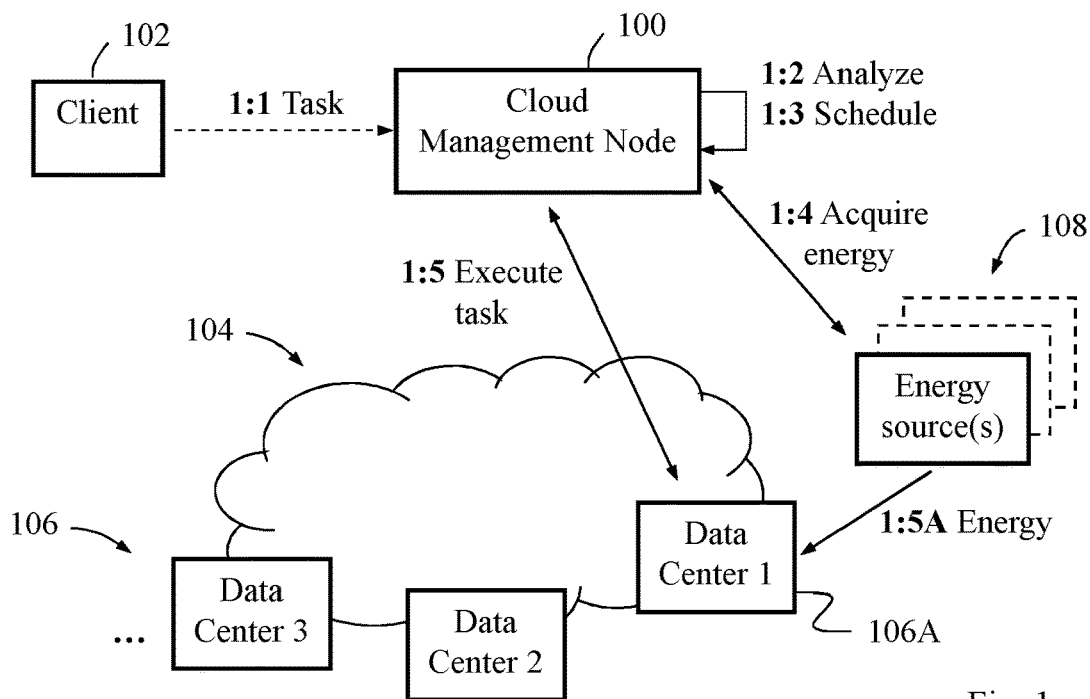
FIG. 1 is a communication scenario illustrating an example when the solution is employed by means of a cloud management node, according to some possible embodiments.

Briefly described, a solution is provided to enable cost-efficient usage of processing resources in a data center for executing a data processing task requested by a client. This solution also enables the client to control how and when the data processing task is executed, and what type of energy source is used. For example, certain energy requirements may have been defined for the client, e.g. in a contract or the like, and the energy source to be used for executing the task may be selected such that these energy requirements are fulfilled. Throughout this description, the term "energy preferences" could be used instead of energy requirements.

The solution and some possible embodiments will now be described in terms of functionality in a cloud management node which is operative to handle execution of data processing tasks in a cloud environment comprising one or more data centers configured to execute such tasks. Although the term "cloud management node" is used throughout this description, other alternative terms that could also be used may include PaaS, cloud computing services provider, cloud manager, data center controller, and so forth.

By obtaining an energy cost over a time period during which the data processing task should be executed, e.g. depending on time requirements of the task, execution of the data processing task can be scheduled within this time period based on the amount of energy needed for completing the task and on the obtained energy cost. Thereby, it is possible to limit or even minimize the cost for executing the task by scheduling the task to a time when the energy cost is preferably as low as possible within the time period during which the task should be executed. A suitable data center may also be selected, from a set of available candidate data centers, for executing the data processing task within said time period, e.g. depending on current load and capacity of the candidate data centers.

In this solution it has been recognized that different data processing tasks may have different time requirements depending on how delay-sensitive they are, and this knowledge can be utilized for scheduling the task to achieve low energy cost by checking and predicting the energy cost over said time period. Some data processing tasks may require more or less immediate execution and delivery to the client before the result of the task becomes less valuable or even obsolete and useless to the client, while other tasks can typically allow some delay before the result is delivered. For example, daily backups and analytical tasks are typically not very delay-sensitive and may tolerate delays even in the range of several hours. It has been further recognized that if a certain delay can be tolerated it is possible to postpone execution of the task until a low, or at least acceptable, energy cost can be achieved.

It may be useful to classify data processing tasks according to how delay tolerant they are, in order to facilitate selection of a data center and scheduling of a task therein. An example of such a classification may be to divide the tasks into three main categories of time requirements, herein referred to as "processing plans", as follows.

A) An "on-demand plan" which indicates that the data processing task should be executed without delay, i.e. more or less immediately. In this case it is not necessary to obtain and consider the energy cost over any time period and execution of such a task goes basically outside the solution described herein.

B) A "reserved plan" which allows a certain delay and indicates a latest time when the data processing task must be finished which is basically dependent on the type of application or purpose the processed data will be used for. In this case the solution can be applied to find the most cost-efficient time for execution of the task within a time period during which the task should be executed.

C) A "flexible plan" which allows any amount of delay and thus indicates that the data processing task can be executed anytime. Even though no final delivery time is required for such a task, the solution can be applied to find the most cost-efficient time for execution of the task within "reasonable" time, e.g. by obtaining and considering the energy cost over some preselected default time period.

The above classes or processing plans are just a few optional examples and there may be other ways of classifying data processing tasks depending on their delay tolerance. For example, the above reserved plan may be divided into several sub-classes depending on the length of the time period during which the data processing task should be executed.

In this description the term "energy cost" generally refers to the cost generated by energy consumption and usage of resources in the cloud. In general, the energy cost for executing a data processing task in a data center is mainly dependent on the energy price applied for the energy source used which is typically predefined and predictable. The energy cost may be further dependent on characteristics and processing capacity of the data center used, e.g. in terms of efficiency and condition of its equipment. The energy cost may be further dependent on which energy source is used and the price ratings applied therefor. The energy cost may further vary over time due to adaptive price ratings and variations in processing load on the data centers. Such variations of the energy cost may include both long-term and short-term variations.

This solution makes it possible to avoid execution of a data processing task during a period with high cost, e.g. in terms of price ratings and/or load in the data centers, provided that the data processing task can wait until lower cost occur. This is accomplished by functionality in the cloud management node which includes determining a time period during which the data processing task should be executed, and obtaining an energy cost during the determined time period. Execution of the data processing task is then scheduled in a suitable data center within the determined time period based on the amount of needed energy and the obtained energy cost.

If the obtained energy cost indicates that the cost for executing the task at a later time within the determined time period is potentially lower than the cost for executing the task immediately, the cloud management node will delay the execution based on the amount of needed energy and the obtained energy cost. Otherwise, the cloud management node can decide to execute the data processing task immediately when the obtained energy cost indicates that the cost is not likely to be reduced within the determined time period. The energy cost may be obtained in various different ways, e.g. based on predefined and known price rating schemes for different energy sources over time and expected load on the data centers, which will be described in more detail later below.

An example of how this solution could be used in practice will now be described with reference to FIG. 1 illustrating a cloud management node 100 which is operative to handle execution of data processing tasks in a cloud environment 104 with multiple data centers 106 or similar. A first action 1:1 indicates that the cloud management node 100 receives a data processing task from a client 102. In order to get the received data processing task executed in a cost-efficient manner, the task is analyzed in another action 1:2 as follows.

This analysis includes estimating how much energy is needed for executing the data processing task and determining a time period during which the data processing task should be executed, e.g. based on time requirements for the data processing task. The time requirements may be indicated in the received data processing task itself or in an agreement with the client such as a contract or the like defined for the client. These time requirements may for example be indicated in terms of a processing plan as described above. Such time requirements may further be defined for different types of applications and/or different types of data.

The cloud management node 100 also obtains an energy cost during the determined time period. The energy cost may be obtained over time during the above determined time period for several candidate data centers so that the "cheapest" data center can be selected for executing the task within the determined time period. The energy cost may further be obtained for different energy sources as well. Energy price ratings over the time period may be obtained from the energy market for different types of energy sources such as solar, wind, water, combustion, nuclear, and so forth. The energy source may further be selected for the task based on preferences of the client, herein referred to as energy requirements.

In a next action 1:3, the cloud management node 100 schedules the data processing task in a data center 106A for execution of the task within the determined time period based on the estimated amount of needed energy and the obtained energy cost. In this action, the data center 106A may be selected from a set of available candidate data centers 106 depending on current load and capacity of the respective candidate data centers 106. It was indicated above that a data center that is capable of executing the task with lowest possible energy cost within the determined time period according to the obtained energy costs of the candidate data centers 106, may be selected for execution of the task. The selected data center 106A may have a queue of data processing tasks to be executed therein, and the data processing task may be placed in the queue for execution by the selected data center 106A.

A further action 1:4 indicates that the cloud management node 100 also selects an energy source 108 for use when executing the data processing task and acquires the needed energy from the energy source 108. The energy source 108 may be selected depending on the client's above-mentioned energy requirements, if any, or based on energy source characteristics such as pricing rates, performance and availability. The selected data center 106A then executes the data processing task in an action 1:5 using energy supplied from the selected energy source 108 as shown by another action 1:5A. When the data processing task has been completed in action 1:5 the results can be delivered to the client 102 in a conventional manner, not shown.

An example will now be described, with reference to the flow chart in FIG. 2, of how the solution may be employed in terms of actions which may be performed in a cloud management node, such as the above-described cloud management node 100, for managing a data processing task requested from a client. Reference will sometimes also be made, without limiting the features described, to the example shown in FIG. 1. The procedure illustrated by FIG. 2 can thus be used to accomplish the functionality described above for the cloud management node 100.

Having received the data processing task from the client, a first action 200 illustrates that the cloud management node 100 estimates an amount of energy needed for executing the data processing task. In an example embodiment, estimating the amount of needed energy may comprise estimating the amount of resources needed for the data processing task and determining the amount of energy consumed when using said amount of resources.

In another action 202, the cloud management node 100 determines a time period during which the data processing task should be executed. It was described above that this time period may be determined based on time requirements for the data processing task which may be defined in a contract or the like for the client or the time requirements may be determined from the type of application and/or data.

In another action 204, the cloud management node 100 obtains an energy cost during the determined time period. As said above the energy cost may be dependent on which energy source is used and the price ratings applied therefor. The energy cost may be dependent on which data center is used. The energy cost may further vary over time and in this case it is of interest to find the lowest cost within the determined time period.

In another action 206, the cloud management node 100 schedules execution of the data processing task within the determined time period based on the estimated amount of needed energy and the obtained energy cost. An example of how this scheduling could be performed will be described in more detail below. In another action 208, the cloud management node 100 acquires the needed energy from an energy source 108 for use when executing the data processing task. A final optional action 210 indicates that the cloud management node 100 may decide to initiate execution of the task although this may effectively have been initiated in action 206 by scheduling the task in a data center which will automatically perform the task accordingly.

This latter optional action 210 may thus be omitted as a possibility to stop execution of the task according to the scheduling made in action 306, e.g. if it turned out that the energy could not be acquired in action 208 according to the energy cost obtained in action 204. This may happen e.g. if the energy market price increases so that the obtained energy cost is no longer accurate, or when the needed energy is currently not available from the energy source 108, for whatever reason. It may also happen that sufficient processing resources may not currently be available. Action 210 provides a possibility to delay and re-schedule execution of the task if needed.

Some further embodiments that may be used in the above procedure will now be described. In one example embodiment, the energy source 108 may be selected based on energy requirements defined for the client 102, which has been discussed in some detail above. For example, a client may have a general desire or policy to use "clean" energy sources such as wind, solar, water and/or nuclear, rather than energy from combustion plants. Alternatively, the energy requirements may dictate that the cheapest possible energy source should be used. In another example embodiment, the amount of needed energy may be estimated based on said energy requirements.

In some further example embodiments, the energy requirements may be related to at least one of:

Energy price, which depends on the energy source and may vary over time for different energy sources. For example, certain types of energy sources such as solar and wind have typically higher price rates than others such as combustion or nuclear plants.

The type of energy source, which may be subject to the client's policy as mentioned above.

Energy efficiency, which may vary between different technologies and individual energy sources.

A Service Level Agreement, SLA, specifying performance requirements by the client. Some energy sources may be capable of fulfilling such performance requirements in an SLA while others may not.

The above "Energy efficiency" means that an energy requirement could be given by a trade-off between execution time and the amount of energy consumed. For example, the task could be executed slower and consuming somewhat less energy than when it is executed very fast and consuming a maximum amount of power that a data center can provide. Such factors could be measured in Watt/processing cycle for CPUs and Watt/bit for network packet forwarding tasks.

In some further example embodiments, the time period may be determined based on a processing plan indicating time requirements for the data processing task, the processing plan being either of:

an on-demand plan indicating that the data processing task should be executed immediately, a reserved plan indicating a latest time when the data processing task must be finished, and a flexible plan indicating that the data processing task can be executed anytime.

These processing plans have likewise been discussed above in some detail. In another example embodiment, said scheduling may comprise selecting a data center 106A from a set of data centers 106, and placing the data processing task in a queue of data processing tasks to be executed by the selected data center 106A. In another example embodiment, the data center 106A may be selected based on current load and capacity in the set of data centers 106. In this embodiment it might be preferable to select a data center with much free capacity instead of a highly loaded one, or it may alternatively be preferable to select a data center with already up and running resources instead of starting new resources in an idle data center. For example, the total addition in energy consumption might be lower when adding computation on top of already used resources, rather than having to start new resources. Such decisions may depend on the power consumption of the equipment used in the data centers, as well as of the power consumption of supporting infrastructure such as cooling and air conditioning.

In another example embodiment, the queue in the selected data center 106A may comprise data processing tasks which are scheduled with regard to respective time requirements for said data processing tasks. It is assumed that the queue in data center 106A allows the current data processing task to be executed as desired within the time period determined in action 202.

Another more detailed example of how the above solution may be implemented in practice will now be described with reference to the flow chart in FIG. 3 comprising actions that may be performed by a cloud management node. In this example, the procedure is divided into different phases including an analyzing phase A, a scheduling phase B, and an execution phase C as follows.

In the analyzing phase A, a first action 300 indicates that a data processing task is received from a client, which corresponds to the above action 1:1. In a next action 302 the amount of processing resources needed for executing the data processing task is estimated. In a further action 304 the amount of energy needed for using the needed resources of action 302 is determined. Actions 302-304 correspond to the above action 200.

A following action 306 illustrates that a time requirement for the data processing task is identified based on a processing plan for the task which may be indicated in the received data processing task or in a predefined contract or agreement, as described above. In another action 308 the time period during which the data processing task needs to be executed is determined, which corresponds to the above action 202. Actions 302-308 further correspond to the above actions 1:2 and 200-204, respectively.

In the scheduling phase B, an action 310 indicates that an energy source is selected based on the client's energy requirements. It has been discussed in some detail above how the energy source could be selected. In another action 312 the energy cost for the selected energy source is obtained over time during the above determined time period, which corresponds to the above action 204. A data center is then selected in action 314 based on current load and capacity in several candidate data centers in the cloud. It was described in some detail above for action 1:3 how a data center can be selected in this context. Some load balancing function may be used when selecting data centers for data processing tasks, in order to achieve load distribution and efficient utilization of the processing resources across the data centers.

Next, the received data processing task is scheduled by placing it in a queue of the selected data center in an action 316, based on the amount of needed energy determined in action 304 and on the energy cost obtained in action 312. Actions 314-316 thus corresponds to actions 1:3 and 206, respectively. Thereby the scheduling phase B is completed.

In the execution phase C, an action 318 indicates that energy is acquired from a selected energy source, which corresponds to actions 1:4 and 208, respectively. The data center selected in action 314 may then be instructed in an action 320 to execute the data processing task in the queue, if not already achieved automatically by placing it in the queue as of action 316. Action 320 thus corresponds to action 210.

Figure 4:
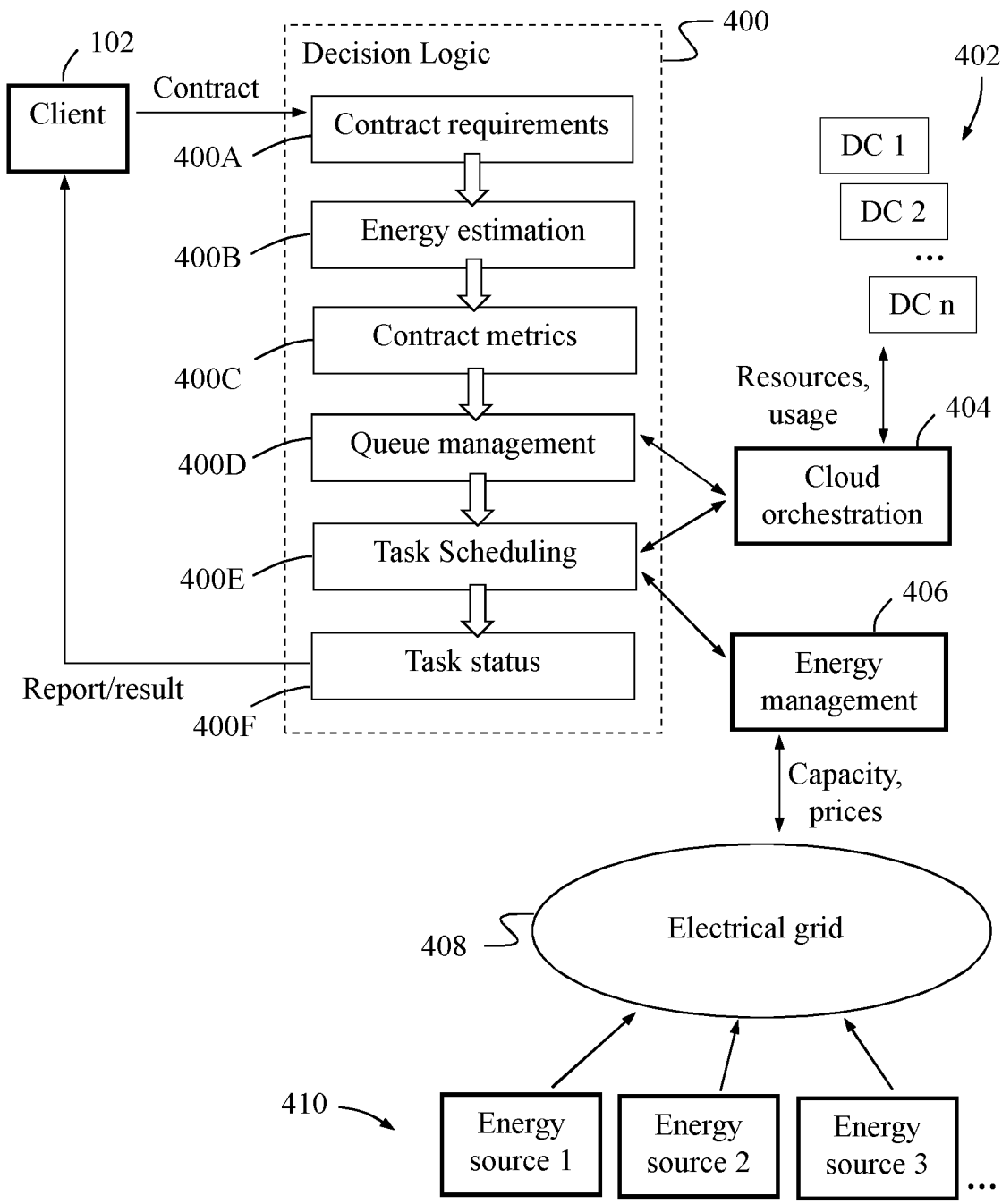
FIG. 4 is a block diagram illustrating an example of a logic operation of the cloud management node when the solution is used, according to further possible embodiments.

FIG. 4 illustrates a non-limiting example of how the above-described functionality may be implemented in practice. In this figure, a decision logic 400 may be a part of the described cloud management node and it may be configured to perform the decisions, determinations and calculations described herein. The decision logic 400 comprises a block 400A for maintaining various requirements in a contract or the like received from a client 102. The requirements in block 400A may be related to the above-described energy requirements and/or time requirements.

The decision logic 400 further comprises a block 400B for energy estimation based on the contract requirements from block 400A, which may be performed in accordance with actions 200 and 302-304, respectively. The energy estimation block 400B is also responsible for translating requirements in the contract 400A into operational metrics which are fed into the next block 400C which is configured to identify and maintain various contract metrics for the client 102, thus reflecting the contract requirements of block 400A. These contract metrics in block 400C may comprise required or preferred values of different operational parameters related to task execution such as a maximum allowed energy consumption, a maximum allowed delay, preferences regarding physical location where the task should be executed, etc.

The decision logic 400 further comprises a block 400D for queue management which controls how data processing tasks can be placed in queues in data centers 402 in accordance with the client's requirements, e.g. with respect to energy requirements and/or time requirements indicated by the contract metrics in block 400C. Block 400D is in this example configured to interact with an entity or module for cloud orchestration 404 which in turn controls the usage of processing resources in the data centers 402, e.g. by employing some load balancing function as mentioned above.

A block 400E in the decision logic 400 is configured to perform the actual scheduling of data processing tasks by interacting with the entity or module for cloud orchestration 404 and with an entity or module for energy management 406. The latter entity or module 406 is configured to obtain information about capacity and energy prices in a number of energy sources 410 which are available through a so-called electrical grid 408 which is basically a network for distributing electricity to data centers in the cloud. The capacity and price information is supplied to the task scheduling block 400E to be used in the manner described above. A final block 400F is configured to determine the status of incoming and ongoing data processing tasks, and to return the results to the client 102.

Figure 5:
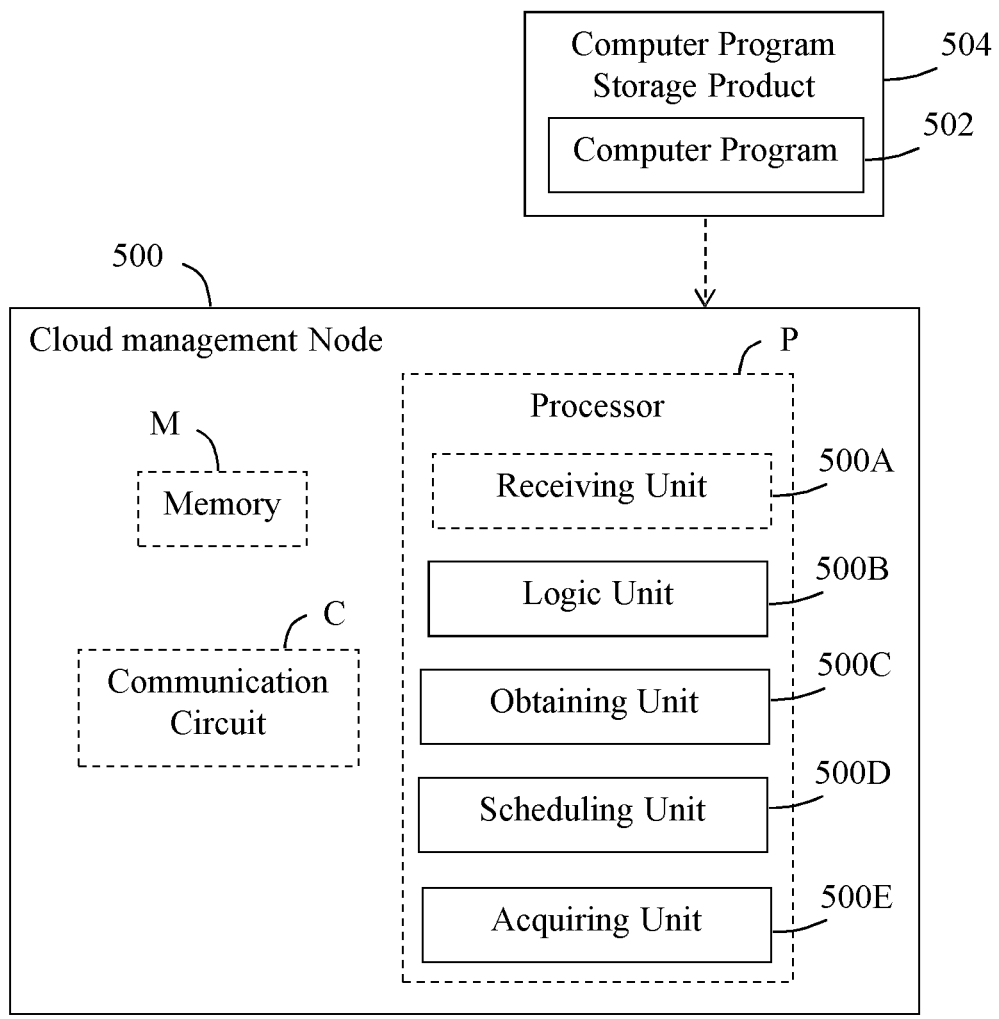
FIG. 5 is a block diagram illustrating how a cloud management node may be configured with functional units, according to further possible embodiments.

The block diagram in FIG. 5 illustrates a detailed but non-limiting example of how a cloud management node 500 may be structured to bring about the above-described solution and embodiments thereof. The cloud management node 500 may be configured to operate according to any of the examples and embodiments of employing the solution as described above, where appropriate, and as follows. The cloud management node 500 is shown to comprise a processor P and a memory M, said memory comprising instructions executable by said processor P whereby the cloud management node 500 is operable as described herein. The cloud management node 500 also comprises a communication circuit C with suitable equipment for receiving and transmitting signals in the manner described herein.

The communication circuit C is configured for communication with other entities using suitable protocols depending on the implementation. This communication may be performed in a conventional manner over one or more communication networks employing suitable links for the communication described herein, which is not necessary to describe here as such in any detail. The solution and embodiments herein are thus not limited to using any specific types of networks, technology or protocols for communication.

Figure 2:
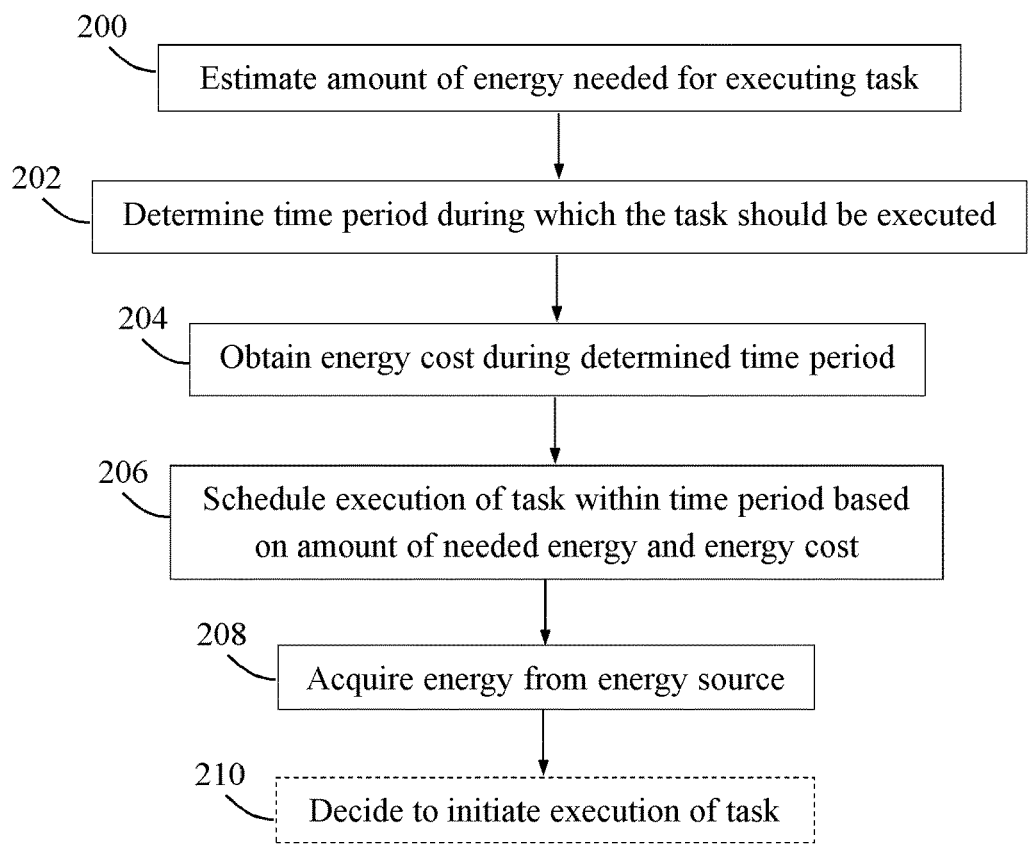
FIG. 2 is a flow chart illustrating a procedure in a cloud management node, according to further possible embodiments.
Figure 3:
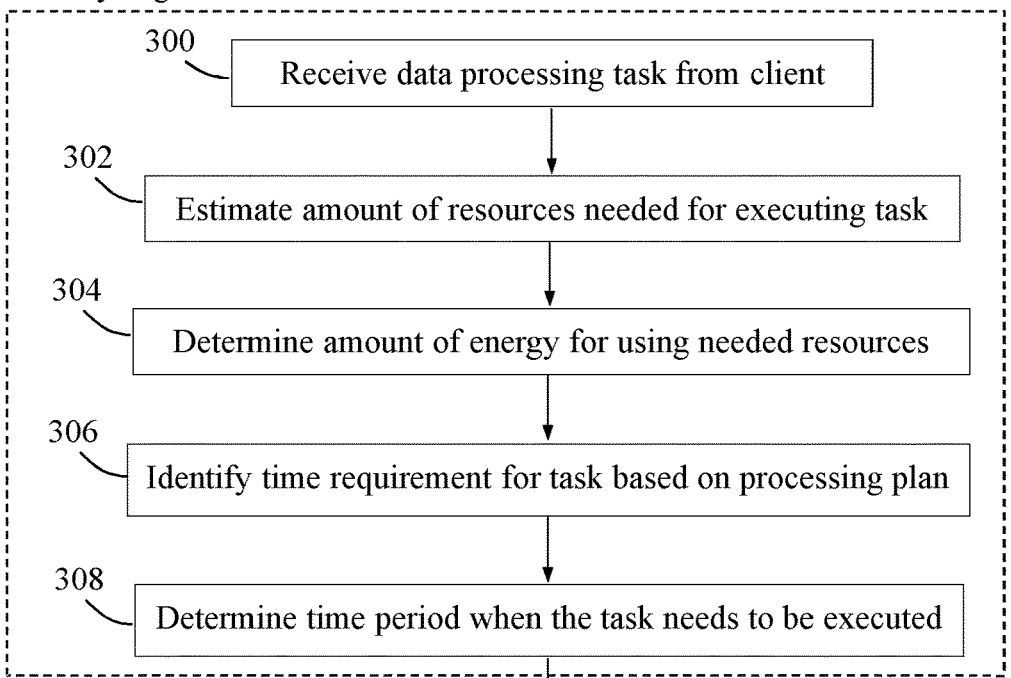
FIG. 3 is a flow chart illustrating a more detailed example of a procedure in a cloud management node, according to further possible embodiments.
Figure 3:
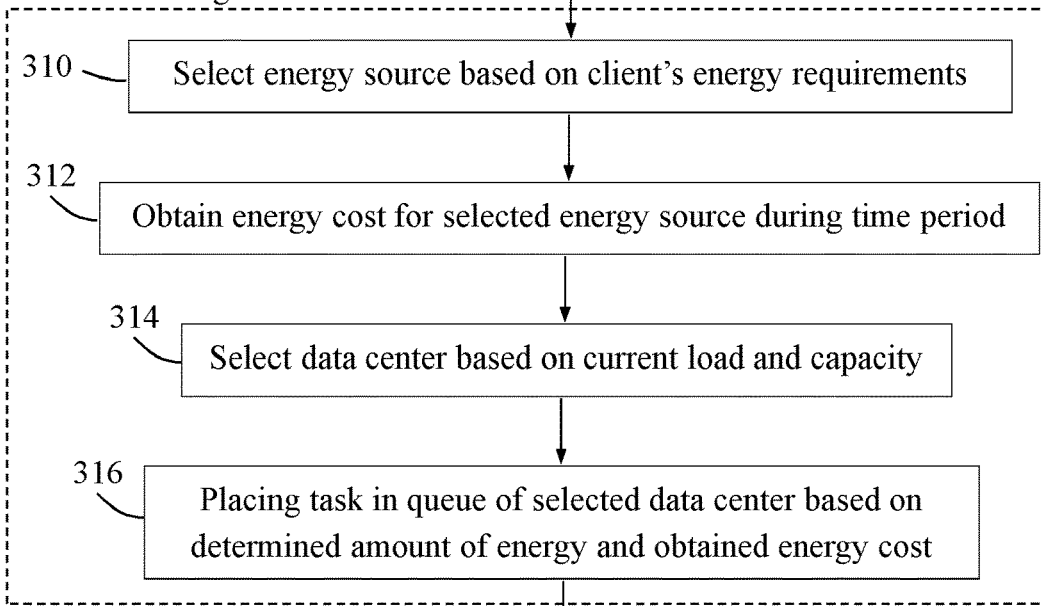
Figure 3:
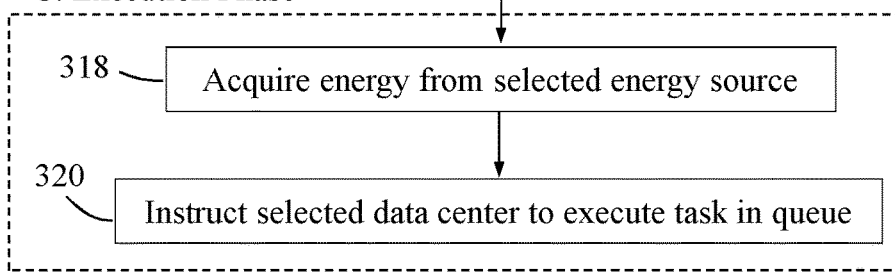

The cloud management node 500 is operable in a cloud environment with multiple data centers and comprises means configured or arranged to perform at least some of the actions 200-210, and 300-320 of the flow charts in FIGS. 2 and 3, respectively. The cloud management node 500 is arranged to manage a data processing task requested from a client such as the client 102 of FIG. 1.

The cloud management node 500 may be configured to receive the data processing task from the client, which corresponds to action 1:1. This operation may be performed by a receiving unit 500A in the cloud management node 500, e.g. in the manner described for action 300 above. The cloud management node 500 is configured to estimate an amount of energy required for executing the data processing task. This operation may be performed by a logic unit 500B in the cloud management node 500, e.g. in the manner described for actions 200 and 302-304 above.

The cloud management node 500 is further configured to determine a time period during which the data processing task should be executed. This operation may be performed by the logic unit 500B, e.g. as described for actions 202 and 306-308 above. The cloud management node 500 is further configured to obtain an energy cost during the determined time period. This operation may be performed by an obtaining unit 500C in the cloud management node 500, e.g. as described for actions 204 and 310-312 above.

The cloud management node 500 is further configured to schedule execution of the data processing task within the determined time period based on the estimated amount of required energy and the obtained energy cost. This operation may be performed by a scheduling unit 500D in the cloud management node 500, e.g. as described for actions 206 and 314-316 above. The cloud management node 500 is further configured to acquire the required energy from an energy source for use when executing the data processing task. This operation may be performed by an acquiring unit 500E in the cloud management node 500, e.g. as described for actions 208 and 318 above.

It should be noted that FIG. 5 illustrates various functional units in the cloud management node 500, and the skilled person is able to implement these functional units in practice using suitable software and hardware. Thus, the solution is generally not limited to the shown structures of the cloud management node 500, and the functional units 500A-E therein may be configured to operate according to any of the features and embodiments described in this disclosure, where appropriate.

The functional units 500A-E described above can be implemented in the cloud management node 500 by means of suitable hardware and program modules of a computer program 502 comprising code means which, when run by the processor P causes the cloud management node 500 to perform at least some of the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The computer program 502 may be carried by a computer program storage product 504 in the cloud management node 500 in the form of a memory having a computer readable medium and being connected to the processor P. The computer program storage product 504 in the cloud management node 500 may thus comprise a computer readable medium on which the computer program 502 is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program storage products in the form of memories within the cloud management node 500.

The solution described herein may thus be implemented in the cloud management node 500 by means of the computer program storage product 504 containing the computer program 502 with computer readable instructions which, when executed on the cloud management node 500, cause the cloud management node 500 to carry out the actions according to any of the above embodiments, where appropriate.

It was described above that the energy cost is obtained as a basis for scheduling a data processing task for a client. An example of how the total costs for executing such a task, referred to as a "job", can be calculated, will now be described in more detail.

The cost to allocate a job is calculated based on the quantity of energy to be purchased, and the plan contracted. The cost to execute the job is determined by the type of plan contracted, a cost to allocate the job, the quantity of power required to run the processing resources needed for the job and the energy price that can be obtained from the energy or electricity market.

These costs may assume different values during the day since the services vary according to the resources usage and the energy prices may fluctuate as well, as mentioned above. The total costs for executing such a task or job, here denoted "JobCost", can be calculated as follows:

$$JobCost = Sr \cdot Sc + Ec \cdot P \quad (1)$$

0≤S=Service rates (Flexible<Reserved<On-demand)
Sc=Service Cost→the cost for processing resources
Ec=Energy Cost→obtained from the energy market
P=Energy needed for executing the task The energy cost is determined based on the electricity price ratings at the moment of the calculus. The energy market may send information about price ratings, power, and availability of energy sources, and energy is acquired for the task based on such energy information and the contracted energy requirements. The time interval for the job allocation can thereby be determined based on future energy prices defined by the energy market and this energy can then be acquired and purchased.

The costs calculus enables the allocation of the task or job on the most affordable data center, considering the energy usage status. The costs for the data center operation typically include several variables, including human resources, building maintenance, cooling, personal computing, energy distribution, and so forth.

The data center's current load status may be obtained at regular time intervals. For this time interval, the system has the knowledge of the price paid for the energy and the quantity of jobs addressed to each data center. Thus, the sum of the energy consumed for each job and to run the processing resources, even in idle state, and the price paid for the energy consumed among all the running jobs provides the value of the energy costs, EC, for the data center as follows.

$$EC = [Pidle \cdot \$ + \Sigma Jobn \cdot \$n]/n \quad (2)$$

EC=Energy costs
Pidle=energy consumption of the resources in idle state
Jobn=energy required for each job processed
$n=price (per kW) paid to power the data center The scheduling of the jobs may be done based on a comparison between the costs to process the job and the energy costs EC to run the data center. Since energy consumption in each data center is typically different than in the other data centers, the cost to run the jobs is different as well in different data centers. It may be preferable to allocate a job to a cheap data center and this decision may be made to minimize the total costs for executing the job.

While the solution has been described with reference to specific exemplifying embodiments, the description is generally only intended to illustrate the inventive concept and should not be taken as limiting the scope of the solution. For example, the terms "cloud management node", "data processing task", "data center", "energy cost", "energy requirements", "time requirements", "processing plan" and "energy source" have been used throughout this disclosure, although any other corresponding entities, functions, and/or parameters could also be used having the features and characteristics described here. The solution is defined by the appended claims.

The invention claimed is:

1. A method for managing a data processing task requested from a client, the method comprising:
   estimating an amount of energy needed for executing the data processing task;
   determining a time period during which the data processing task should be executed;
   obtaining for each one of a plurality of data centers a cost to process the data processing task on each data center and an energy cost during the determined time period, the cost to process the data processing task on a given data center comprising a product of a delay tolerance based service rate and a cost of processing resources on the given data center used to process the data processing task and the energy cost for the given data center comprising a total cost of energy consumed by the processing resources during any idle state and during execution of each job running on the given data center divided by a number of jobs running on the given data center;
   selecting one of the plurality of data centers based on the obtained costs to process data processing tasks and energy costs;
   scheduling execution of the data processing task on the selected one of the plurality of data centers within the determined time period; and
   acquiring, through an electrical grid configured to distribute electricity from multiple energy sources, the needed energy from an energy source selected from among the multiple energy sources for use when executing the data processing task.

2. A method according to claim 1, wherein the energy source is selected based on energy requirements defined for the client.

3. A method according to claim 2, wherein the amount of needed energy is estimated based on said energy requirements.

4. A method according to claim 2, wherein the energy requirements are related to at least one of:
   energy price;
   type of energy source;
   energy efficiency; and
   a Service Level Agreement, SLA, specifying performance requirements by the client.

5. A method according to claim 1, wherein the time period and the delay tolerance based service rate are determined based on a processing plan indicating time requirements for the data processing task, the processing plan being either of:
   an on-demand plan indicating that the data processing task should be executed immediately;
   a reserved plan indicating a latest time when the data processing task must be finished; and a flexible plan indicating that the data processing task can be executed anytime.

6. A method according to claim 1, wherein said scheduling comprises placing the data processing task in a queue of data processing tasks to be executed by the selected one of the plurality of data centers.

7. A method according to claim 6, wherein the queue comprises data processing tasks which are scheduled with regard to respective time requirements for said data processing tasks.

8. A method according to claim 1, wherein the delay tolerance based service rate comprises a value between zero and one.

9. A method according to claim 1, wherein estimating the amount of needed energy comprises estimating the amount of resources needed for the data processing task and determining the amount of energy consumed when using said amount of resources.

10. A computer program comprising instructions which, when executed on at least one processor, cause the at least one processor to carry out the method according to claim 1.

11. A carrier containing the computer program of claim 10, wherein the carrier is one of an electronic signal, an optical signal, a radio signal, a computer program storage product or a computer readable storage medium.

12. A cloud management node arranged to manage a data processing task requested from a client, the cloud management node comprising:
a communication circuit to receive the data processing task;
a processor; and
memory storing instructions executable by said processor to cause the cloud management node to:
estimate an amount of energy needed for executing the data processing task;
determine a time period during which the data processing task should be executed;
obtain for each one of a plurality of data centers a cost to process the data processing task on each data center and an energy cost during the determined time period, the cost to process the data processing task on a given data center comprising a product of a delay tolerance based service rate and a cost of processing resources on the given data center used to process the data processing task and the energy cost for the given data center comprising a total cost of energy consumed by the processing resources during any idle state and during execution of each job running on the given data center divided by a number of jobs running on the given data center;
select one of the plurality of data centers based on the obtained costs to process data processing tasks and energy costs;
schedule execution of the data processing task on the selected one of the plurality of data centers within the determined time period; and
acquire, through an electrical grid configured to distribute electricity from multiple energy sources, the needed energy from an energy source selected from among the multiple energy sources for use when executing the data processing task.

13. A cloud management node according to claim 12, wherein the cloud management node is configured to select the energy source based on energy requirements defined for the client.

14. A cloud management node according to claim 13, wherein the cloud management node is configured to estimate the amount of needed energy based on said energy requirements.

15. A cloud management node according to claim 13, wherein the energy requirements are related to at least one of:
energy price;
type of energy source;
energy efficiency; and
a Service Level Agreement, SLA, specifying performance requirements by the client.

16. A cloud management node according to claim 12, wherein the cloud management node is configured to determine the time period and the delay tolerance base service rate based on a processing plan pertaining to the data processing task, the processing plan being either of:
an on-demand plan indicating that the data processing task should be executed immediately;
a reserved plan indicating a latest time when the data processing task must be finished; and
a flexible plan indicating that the data processing task can be executed anytime.

17. A cloud management node according to claim 12, wherein the cloud management node is configured to perform said scheduling by placing the data processing task in a queue of data processing tasks to be executed by the selected one of the plurality of data centers.

18. A cloud management node according to claim 17, wherein the queue comprises data processing tasks which are scheduled with regard to respective time requirements for said data processing tasks.

19. A cloud management node according to claim 12, wherein the delay tolerance based service rate comprises a value between zero and one.

20. A cloud management node according to claim 12, wherein the cloud management node is configured to estimate the amount of needed energy by estimating the amount of resources needed for the data processing task and determining the amount of energy consumed when using said amount of resources.

\* \* \* \* \*